Aug. 6, 1963   B. SHENKER ETAL   3,100,262
DOSIMETER OF THE RADIO PHOTOLUMINESCENT GLASS TYPE
Filed July 19, 1961   2 Sheets-Sheet 1
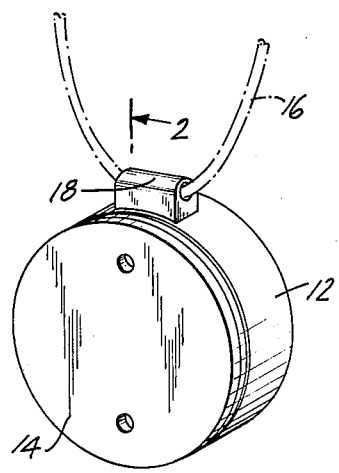
FIG. 1
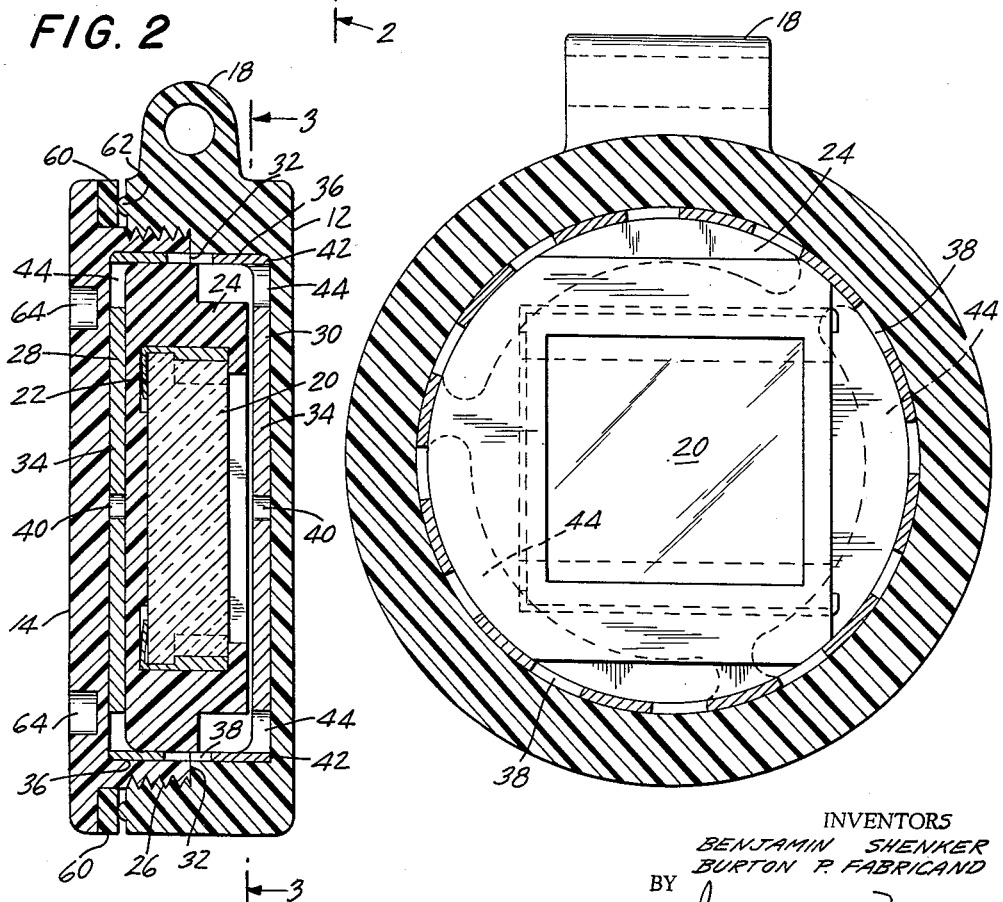
FIG. 2
FIG. 3
INVENTORS
BENJAMIN SHENKER
BURTON P. FABRICAND
BY
James and Franklin
ATTORNEYS

RESPONSE OF DOSIMETER DIVIDED
BY TRUE DOSE AT 100 KEV.

INVENTORS
BENJAMIN SHENKER
BURTON P. FABRICAND
BY
ATTORNEYS

3,100,262
DOSIMETER OF THE RADIO PHOTOLUMINESCENT GLASS TYPE

Benjamin Shenker, Brooklyn, and Burton P. Fabricand, Dobbs Ferry, N.Y., assignors to Industrial Electronic Hardware Corp., New York, N.Y., a corporation of New York
Filed July 19, 1961, Ser. No. 125,168
10 Claims. (Cl. 250—83)

This invention relates to dosimeters, and more particularly to a personnel dosimeter of the type usually worn about the neck.

The general object of the present invention is to improve such dosimeters. More particular objects are to provide a dosimeter which is small in dimension, light in weight, water-tight and tamper-proof. A further object is to provide a dosimeter having substantially uniform response regardless of the angle of incidence and energy of the radiation (between 80 kev. and 1.3 mev.) striking the dosimeter. The sensitive element is housed in a two-part case which is sealed with the aid of a gasket, and one object of the invention is to make possible the use of a gasket made of irradiated polyethylene, which affords significant advantages.

To accomplish the foregoing objects, and other more specific objects which will hereinafter appear, our invention resides in the dosimeter elements, and their relation one to another, as are hereinafter more particularly described in the following specification. The specification is accompanied by drawings, in which:

FIG. 1 is a perspective view showing a dosimeter embodying features of our invention;

FIG. 2 is a transverse section taken approximately in the plane of the line 2—2 of FIG. 1, and drawn to enlarged scale;

FIG. 3 is a section taken approximately in the plane of the line 3—3 of FIG. 2;

Figure 4:
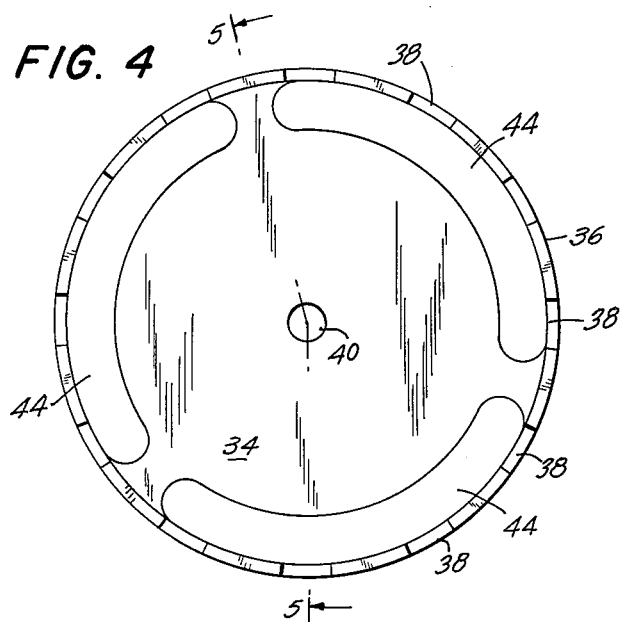
FIG. 4 is a front view of one of the two dished lead shields which line the case, and which enclose the sensitive element.

The dosimeter is capable of measuring X and gamma radiation over a range of from 0 to 600 roentgens. It is a personnel dosimeter which is worn pendant about the neck. The dosimeter is not self-indicating, and indeed is enclosed and preferably tamper-proof. The detecting element is a radio-photoluminescent glass, which may be removed when desired and tested in a special computer-indicator provided for that purpose. The dosimeter is designed for military service, and is intended to remain reliable under the varied and severe conditions of such service.

Referring to the drawing, and more particularly to FIG. 1, the outer case is a generally cylindrical body 12 closed by a cover 14, and hung by a suitable cord 16 passing through an ear 18 molded integrally with the body 12.

Referring now to FIGS. 2 and 3, the outer case shields and protects an inner assembly which includes a square parallelepiped of radio-photoluminescent glass 20, held by a metal retainer clip 22 in a cushioning pad 24. The pad is preferably made of black linear polyethylene, and is circular in outline, and dimensioned to be received in and to fill the interior of the case. This inner assembly is not new, and forms no part of the present invention except in combination with the outer case.

As shown in FIG. 2 the body 12 of the outer case has an internal thread, and the cover 14 has an external thread received by the body 12 as shown at 26. Each part of the case is lined with an appropriately apertured lead lining indicated at 28 and 30. These linings are dished in configuration and meet in edge-to-edge relation as shown at 32. The threaded cover 14 is preferably made deep enough to reach halfway across the hollow chamber of the case, so that the linings 28 and 30 may be identical in construction and dimension.

The dished lead shields (see FIGS. 4 and 5) provide face walls 34 and edge walls 36. The edge walls are notched, as is most clearly shown at 38 in FIG. 5. The face walls have a central aperture indicated at 40. This controls or limits the response to radiation of energy less than 300 kev. approaching the flat surface of the sensitive element (20 in FIG. 2). The notches 38 limit the response to radiation of energy less than 300 kev. which approaches the sensitive element edgewise, and the area of these edge apertures or windows is substantially greater than that of the holes 40.

Figure 5:
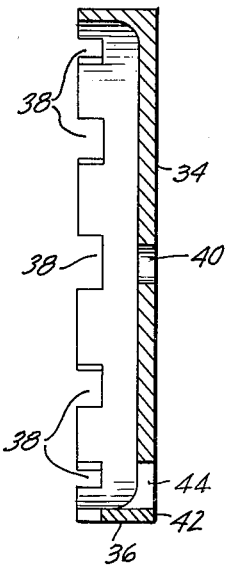
FIG. 5 is a transverse section taken approximately in the plane of the line 5—5 of FIG. 4.

In addition to the foregoing, and in accordance with a particular feature of the present improvement, the face walls 34 are also cut away adjacent the corner 42 (FIGS. 2 and 5) as indicated by the arcuate windows 44 best shown in FIG. 4. These windows are large in area, and indeed occupy almost the entire periphery of the shield.

The casing parts 12 and 14 are molded out of a suitable plastics material, preferably black ethyl cellulose, and they may be molded with the shields in situ, so that the openings or windows 38, 40 and 44 previously referred to, are filled with the plastics material. The interior of the case then is smooth.

In a specific example the detecting element or glass 20 is approximately ¾ x ¾ x 0.18 inch in dimension. The circular pad 24 fills the interior of a lead lining having an outside diameter of approximately 1¼ inches. The thickness of the face lining 34 is 0.042 inch and that of the edge lining 36 is 0.025 inch. The central hole 40 in each shield has an area of approximately 0.0078 square inch ($D=0.099$). The edge notches 38 have a much larger area, and in the present case the total area of the edge notches is approximately 0.0792 square inch for each shield. Each notch is 0.128 by 0.066 inch deep. The arcuate windows 44 in the face walls are of very large area, and total approximately 0.375 square inch for each shield. They are 0.124 inch in width.

The said areas are so relatively proportioned as to provide substantially uniform response, regardless of directivity of the incident radiation, and of the energy of the radiation within the practical defined limits of 80 kev. and 1.3 mev.

Figure 6:
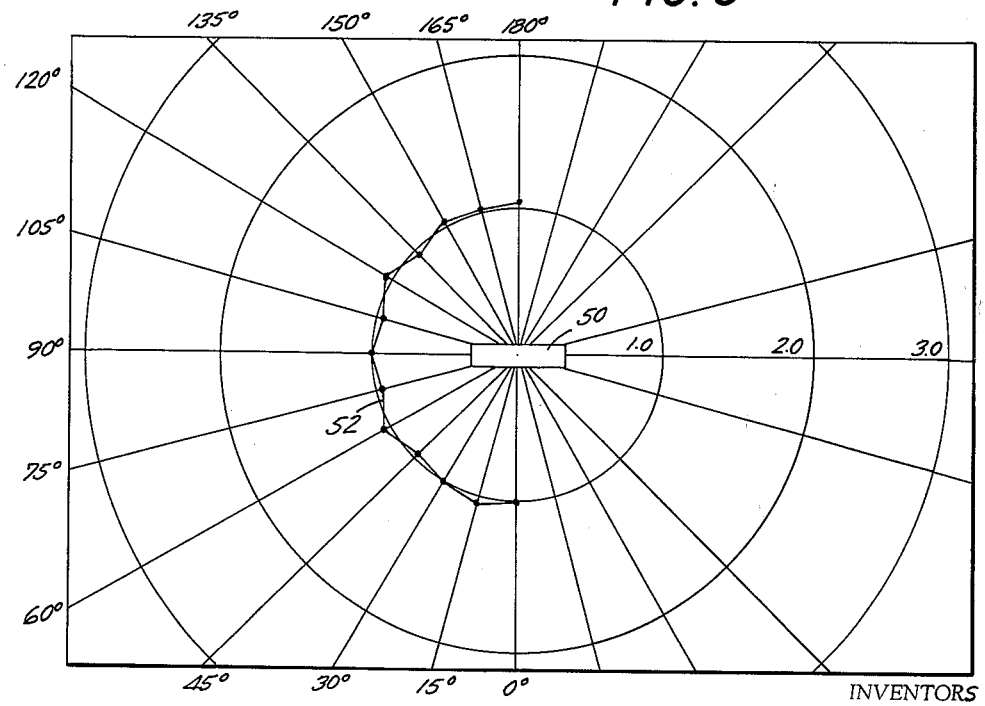
FIG. 6 is a directional dependence graph showing the approximately uniform response of the dosimeter.

This is illustrated by the directional graph of FIG. 6. A diametrical plane through the dosimeter is indicated by the rectangle 50. The angle of incident radiation is shown from 0 to 180 degrees, and would be the same around the other half of the graph. The response of the dosimeter divided by the true dose is indicated by the line 52, which rather closely follows the circle marked 1.0, this circle indicating the point at which the radiation dosage measured by the dosimeter equals the true dosage.

This response is substantially the same, whether the plane used extends from flat edge to flat edge of the glass, or from corner to corner of the glass.

Reverting to FIG. 2, the case is sealed with the aid of a gasket 60. This is preferably made of black linear polyethylene which has been irradiated. Such a gasket has the advantage of not changing when later subjected to radiation. Its great desirability has been known, but it has not been possible heretofore to obtain a water tight joint with this material. Instead rubber or neoprene and other substitutes have been used in order to obtain a water tight joint, and despite the disadvantage that these materials fluoresce and outgas and thereby spoil the accuracy of the unit.

We have found that a water tight joint is obtainable with a polyethylene gasket if used in conjunction with a half-round bead, as indicated at 62 in FIG. 2. In the dosimeter here shown the bead has a radius of 0.025 inch and is located half way between the inner and outer edges of the gasket. The width in radial direction of the gasket 60, and consequently of the flanges between which the gasket is located, is 0.109 inch. The gasket is 0.055 inch thick, and is stamped (die cut) out of sheet material.

Even with the aid of the bead 62 it requires a considerable torque and a fairly fine thread to obtain the pressure needed for a water tight joint. We provide a pair of diametrically spaced blind holes 64 in the cover 14 which holes receive a special tool or wrench. The body 12 does not require similar holes because it may be held against turning in a suitable jig or fixture bearing on the ear 18. The thread here used has 1⅜–18 threads per inch, extra fine. The cover is tightened with a torque of from forty to sixty inch pounds, and is turned at least two full turns.

All of these facts constitute advantages for the present purpose because this dosimeter is not self-indicating, and instead must be turned over to a special technician for removal of the sensitive element for measurement of the amount of exposure to radiation in a special computer indicator device. It is intended that the dosimeter be tamper proof insofar as personnel wearing the same is concerned. The fact that the unit needs a high torque applied with special tools for several revolutions to open the same, helps insure that the unit will be left untampered and in water tight condition, as is desired.

The halves of the case are so designed that the lead linings come together in edge-to-edge relation when the case has been closed with the specified torque. There is a slight tolerance, because on the one hand the meeting edges may yield slightly, and on the other hand, a slight gap of a few thousandths of an inch is not critical. In practice the effective area of such a gap or crevice does not extend entirely around the periphery of the dosimeter, because ordinarily the incident radiation approaches from a point source, and over only a small angle.

The spring clip 22 which holds the glass in the cushion is made of metal, preferably beryllium copper, or black nickel plate. The cushion pad 24 is made of black linear polyethylene, which preferably is irradiated, and similar remark applies to the gasket 60. The lead liner is made of the best grade of commercial pure lead. The antimony content of the lead liner is not to exceed five percent. It is preferably die cast. The plastic case is made of black ethyl cellulose.

The placing of the large arcuate windows 44 in the face walls 34 simplifies the die casting operation, and strengthens the lining against handling when used as an insert in the plastics mold. It permits the use of very large arcuate windows, and these in turn result in a substantial saving of material, and what is more significant, an equivalent saving in the weight of the dosimeter. This is important because it must be worn about the neck by a cord, and is less annoying and more likely to be worn when light in weight.

It is believed that the construction and method of our improved dosimeter, as well as the advantages thereof, will be apparent from the foregoing detailed description. It will also be apparent that while we have shown and described our invention in a preferred form, changes may be made in the structure shown without departing from the scope of the invention, as sought to be defined in the following claims.

We claim:

1. A dosimeter comprising an inner assembly and an outer case therearound, said inner assembly including a radio photoluminescent glass, said outer case comprising a generally cylindrical body and a cover secured thereto, each of said parts being lined with a single integral dished lead shield providing face and edge walls, said shields being substantially larger in diameter than the glass, said edge walls being notched, said face walls having a central aperture, and said face walls also being cut away adjacent the corner and outside the glass for almost the entire periphery of the dished shield.

2. A dosimeter comprising an inner assembly and an outer case therearound, said inner assembly including a square parallelepiped of radio photoluminescent glass held by a retainer clip in a cushioning pad, said outer case comprising a generally cylindrical body and a cover secured thereto, each of said parts being lined with a single integral dished lead shield providing face and edge walls, said shields having the same diameter and being substantially larger in diameter than the glass, said edge walls being notched, said face walls having a central aperture, and said face walls also being cut away adjacent the corner to form arcuate windows outside the glass for almost the entire periphery of the dished shield.

3. A dosimeter comprising an inner assembly and an outer case therearound, said inner assembly including a square parallelepiped of radio photoluminescent glass held by a retainer clip in a cushion pad, said outer case comprising a generally cylindrical body and a cover secured thereto, each of said parts being lined with a single integral dished lead shield providing face and edge walls, said shields being substantially larger in diameter than the glass, said edge walls being notched, said face walls having a central aperture, and said face walls also being cut away adjacent the corner to form arcuate windows outside the glass for almost the entire periphery of the dished shield, the face aperture being of small area, the edge notches being of much larger area, and the arcuate windows being of very large area, the said areas being so relatively proportioned as to provide substantially uniform response regardless of directivity and energy of the incident radiation.

4. A dosimeter comprising an inner assembly and an outer case therearound, said inner assembly including a square parallelepiped of radio photoluminescent glass held by a retainer clip in a cushioning pad, said outer case comprising a generally cylindrical body and a cover secured thereto, each of said parts being lined with a single integral dished lead shield providing face and edge walls, said shields being substantially larger in diameter than the glass, said edge walls being notched, said face walls having a central aperture, and said face walls also being cut away adjacent the corner and outside the glass for almost the entire periphery of the dished shield, said casing parts being molded out of plastics material with the shields in situ whereby the aforesaid openings are filled with the plastics material.

5. A dosimeter comprising an inner assembly and an outer case therearound, said inner assembly including a radio photoluminescent glass, said outer case comprising a generally cylindrical body and a cover secured thereto, said parts being lined with a single integral lead shield providing face and edge walls, said edge wall having openings, said face walls having a central aperture, and said face walls also being cut away adjacent the corner to form arcuate windows outside the glass for almost the entire periphery of the shield, said glass being approximately ¾ x ¾ x 0.18 inch in dimension, said lining having a diameter of approximately 1¼ inch, the total area of the edge openings being approximately 0.1584 square inch, the central holes each having an area of approximately .0078 square inch, and the arcuate corner windows having a total area of approximately 0.375 square inch on each face wall.

6. A dosimeter comprising an inner assembly and an outer case therearound, said inner assembly including a square parallelepiped of radio photoluminescent glass held by a retainer clip in a cushioning pad, said outer case comprising a generally cylindrical body and a cover secured thereto, each of said parts being lined with a single integral dished lead shield providing face and edge walls, said edge walls being notched, said face walls having a central aperture, and said face walls also being cut away adjacent the corner to form arcuate windows outside the glass for almost the entire periphery of the dished shield, said casing parts being molded out of plastics material with the shields in situ whereby the aforesaid openings are filled with the plastics material, said glass being approximately ¾ x ¾ x 0.18 inch in dimension, said linings having a diameter of approximately 1¼ inch, the total area of the edge notches in each shield being approximately 0.0792 square inch, the central hole in each shield having an area of approximately 0.0078 square inch, and the arcuate corner windows having a width of approximately 0.124 inch and having a total area of approximately 0.375 square inch for each shield.

7. A dosimeter comprising an inner assembly and a case therearound, said inner assembly including a radio-photoluminescent glass, said outer case comprising a cylindrical body with an internal thread, and a cover with an external thread received by the body, said case parts each being lined with an appropriately apertured single integral dished lead lining, said cover having a flange outside the thread provided with a flat gasket made of irradiated polyethylene, the meeting edge of the casing being provided with a half-round bead disposed about midway of the width of the gasket.

8. A dosimeter comprising an inner assembly and a case therearound, said inner assembly including a radio-photoluminescent glass, said outer case comprising a cylindrical body with an internal thread, and a cover with an external thread received by the body, said case parts each being lined with an appropriately apertured single integral dished lead lining, said cover having a flange outside the thread provided with a flat gasket made of irradiated polyethylene, the meeting edge of the casing being provided with a half-round bead disposed about midway of the width of the gasket, said cover having a pair of diametrically spaced holes to receive a special wrench for tightening the cover with a torque of 40 to 60 inch pounds, in order to make the casing water tight and tamper proof.

9. A dosimeter comprising an inner assembly and an outer case therearound, said inner assembly including a radio-photoluminescent glass held in a pad, said outer case comprising a generally cylindrical body and a cover secured thereto, each of said parts being lined with a single integral dished lead shield providing face and edge walls, said shields having the same diameter and being substantially larger in diameter than the glass, said edge walls being notched, said face walls having a central aperture, and said face walls also being cut away adjacent the corner to form arcuate windows outside the glass for almost the entire periphery of the dished shield, the face aperture being of small area, the edge notches being of much larger area, and the arcuate windows being of very large area, and the said areas being so relatively proportioned as to provide substantially uniform response regardless of directivity of the incident radiation.

10. A dosimeter comprising an inner assembly and a case therearound, said inner assembly including a radio-photoluminescent glass held in a pad, said outer case comprising a cylindrical body with an internal thread, and a cover with an external thread received by the body, said case parts each being lined with a single integral dished lead shield providing face and edge walls, said shields having the same diameter and being substantially larger in diameter than the glass, said edge walls being notched, said face walls having a central aperture, and said face walls also being cut away adjacent the corner to form arcuate windows outside the glass for almost the entire periphery of the dished shield, the face aperture being of small area, the edge notches being of much larger area, and the arcuate windows being of very large area, the said areas being so relatively proportioned as to provide substantially uniform response regardless of directivity of the incident radiation, said cover having a flange outside the thread provided with a flat gasket made of irradiated polyethylene, and the meeting edge of the casing being provided with a half-round bead disposed about midway of the width of the gasket.

References Cited in the file of this patent

UNITED STATES PATENTS

| | | |
|---|---|---|
| 2,752,505 | Klick | June 26, 1956 |
| 3,042,802 | Just et al. | July 3, 1962 |